April 10, 1951     R. W. LUCE     2,548,168
FOOD RECEPTACLE WITH DESICCANT
Filed Jan. 4, 1949
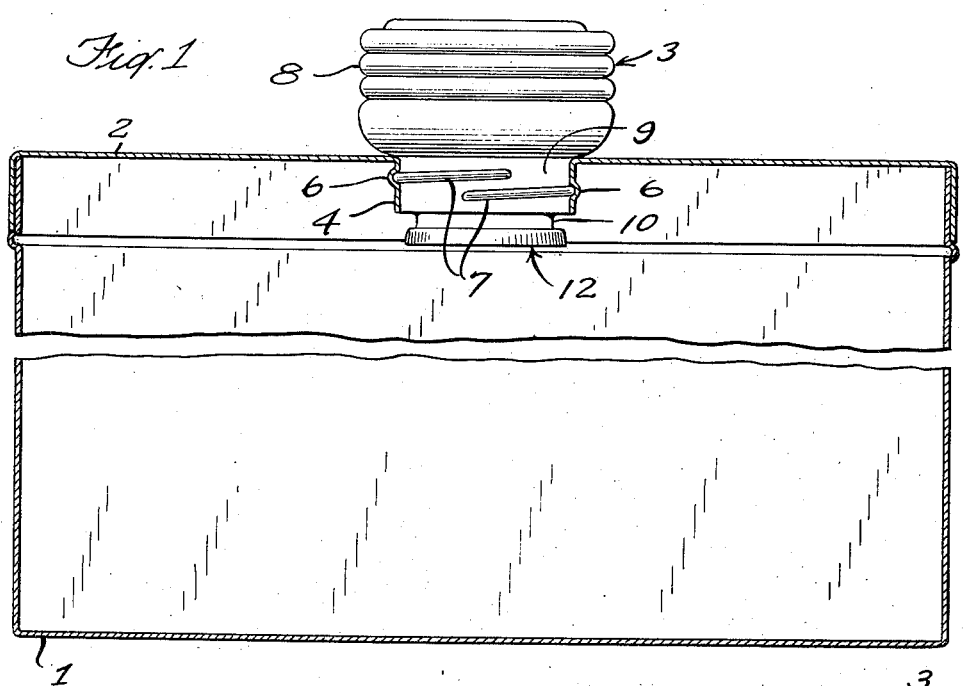
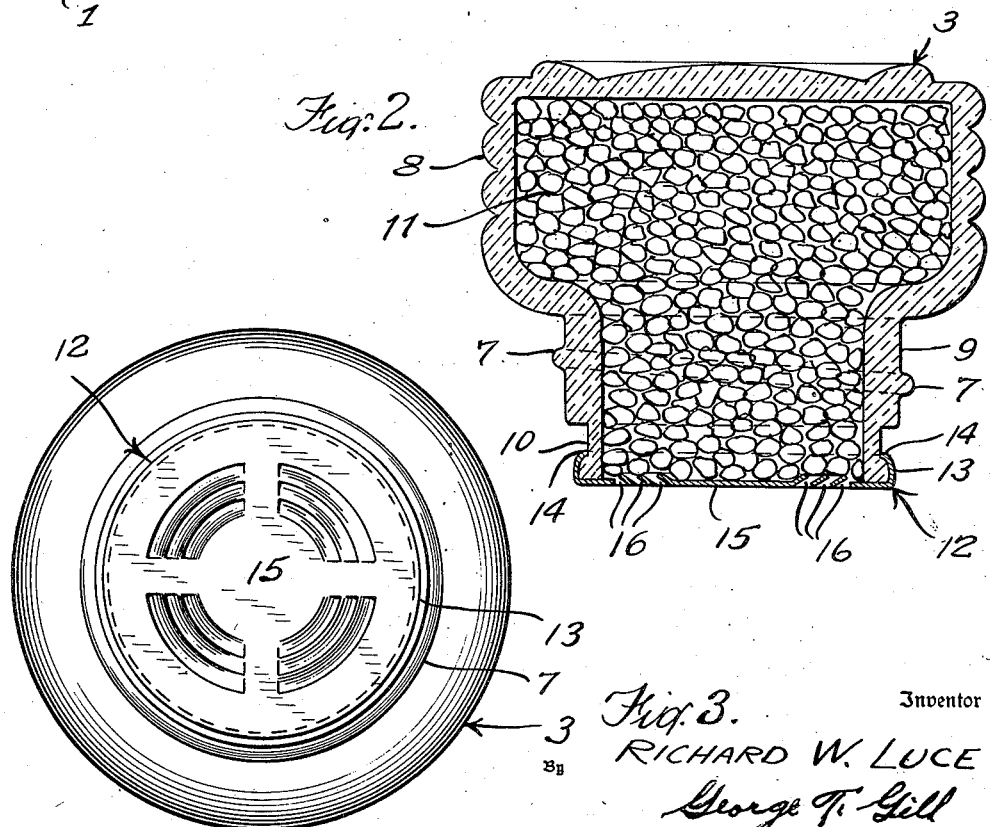
Inventor
RICHARD W. LUCE
George T. Gill
Attorney Patented Apr. 10, 1951

2,548,168

UNITED STATES PATENT OFFICE 2,548,168

FOOD RECEPTACLE WITH DESICCANT

Richard W. Luce, Southport, Conn., assignor to Luce Manufacturing Company, Groton, Vt., a corporation of Delaware Application January 4, 1949, Serial No. 69,199

2 Claims. (Cl. 312—31.1)

The invention herein disclosed relates to a receptacle especially useful for storing hygroscopic edible material. More particularly, the invention relates to a receptacle that is particularly adapted for maintaining in the home hygroscopic foods, such, for example, as crackers, nuts etc., in a dry, crisp state.

An object of the invention is to provide a receptacle of the kind mentioned that includes a holder for a regenerative desiccant. Another object of the invention is to provide in such a container a removable holder for a desiccant. A further object of the invention is to provide a container of the kind mentioned with a translucent holder for a desiccant having a color indicator. Another object of the invention is to provide a container of the kind mentioned that is comparatively inexpensive to manufacture.

The foregoing objects and certain advantages that will hereinafter appear are realized in the embodiment of the invention illustrated in the accompanying drawing and described in detail below, from which description a clear understanding of the invention may be had.

The drawing includes:

Fig. 1 which is a longitudinal, sectional elevation of a canister embodying the invention;

Fig. 2 which is a sectional elevation of the holder for the desiccant; and

Fig. 3 which is a bottom, plan of the holder for the desiccant.

In general, the receptacle of this invention includes a container for food, a cover for the container, and a holder containing a desiccant associated with the cover and communicating with the container when the cover is in place on the container. In the accompanying drawing, the invention is illustrated as it is applied to a canister of the kind commonly used in storing, in the home, crackers and the like which take up moisture in humid weather, become soggy and spoil. The receptacle illustrated includes a can 1 for containing the food which is to be kept in a dry state, a cover 2 for the can, and a desiccant holder 3 associated with and forming a knob for the cover 2. In the construction illustrated, the cover 2 has an opening centrally thereof and an inwardly extending, cylindrical flange 4 at the opening. The flange 4 is provided with a thread 6 therein which cooperates with a like thread 7 on the desiccant holder for removably securing the desiccant holder to the cover.

The desiccant holder, in the embodiment illustrated, is in the form of a hollow glass knob. It is molded from heat resistant glass which is transparent or at least sufficiently translucent for color to be visible therethrough. The holder includes a knob portion 8, and a neck or reduced portion 9 of a diameter to be received in the opening in the cover 2. The thread 7 is formed on the neck portion 9. Adjacent the free end of the holder, which end is initially open, there is formed a circumambient groove 10.

The holder is filled with a regenerative desiccant 11, one from which moisture may be driven off by heat, such, for example, as aluminum oxide or silica gel to which there is added a color indicator. Normally, when the desiccant is dry it is blue in color, and when it becomes saturated, it turns pink. Upon being heated, the moisture absorbed is driven off and the blue color returns. It may be used indefinitely.

After the holder is filled with the desiccant, the open end of the neck of the holder is closed, to retain the desiccant therein, by a perforated metal cap 12. The cap 12 is provided with a skirt 13 which receives the end of the neck portion 9 and which is spun or folded as at 14 into the groove 10. The cap is thus permanently secured in place. Through the end face 15 of the cap, there is a series of openings or grooves 16. These are formed by shearing the metal along the lines indicated and bending the metal inwardly, slightly, so that grooves or passages are formed which permit the passage of air but which will not pass the desiccant.

In the position shown in Fig. 1, of the drawing, air within the container may pass into the holder and in contact with the desiccant. The moisture is thus extracted from the air in the container and the contents are maintained in the dry state. The desiccant within the holder is, at all times visible. When it turns pink, the holder is unscrewed from the cover and placed in a heated oven for a short period of time. In this way the moisture is driven off from the desiccant, and the holder is replaced on the cover. The holder, as will be seen, serves the dual purpose of a knob for removing and replacing the cover and as a holder for the desiccant.

From the foregoing description of the embodiment of the invention illustrated in the drawing and described above, it will be apparent to those skilled in the art that by this invention there is provided a receptacle in which food may be maintained dry and crisp, a receptacle that will last indefinitely and in which its effectiveness is always discernible by a visual indicator.

It will be obvious that various changes may be made by those skilled in the art in the details of the embodiment of the invention illustrated in the drawing and described above within the principle and scope of the invention as expressed in the appended claims.

I claim:

1. A desiccant holder for absorbing moisture from the air in a food container, which holder consists of transparent, heat-resistant glass and includes a hollow, open, dome-shaped portion and a portion of lesser diameter at the opening thereto with a circumambient bead at the edge thereof, a perforated metal cap at the portion of lesser diameter having the edge thereof spun over the said bead, whereby the cap is permanently affixed to the holder, and a regenerative desiccant with a color indicator within the holder and visible therethrough.

2. For a receptacle especially adapted for containing hygroscopic food and including a container for the food and a cover having an opening therethrough adapted to receive a threaded shank; a desiccant holder adapted to be received in the opening through the cover, the desiccant holder consisting of color-transparent, heat-resistant glass and including a hollow, dome-shaped portion constituting a knob by which the cover may be removed from the container and a cylindrical skirt portion of lesser diameter than the dome-shaped portion and having a thread thereon adapted to be received in threaded engagement in the opening through the cover and a circumambient bead at the end thereof, a perforated metal cap at the end of the skirt portion having the edge thereof spun over the said bead, whereby the cap is permanently affixed to the holder, and a regenerative desiccant with a color indicator within the holder and visible therethrough.

RICHARD W. LUCE.

REFERENCES CITED

The following references are of record in the file of this patent:

UNITED STATES PATENTS

| Number | Name | Date |
| --- | --- | --- |
| 1,425,790 | Moyer | Aug. 15, 1922 |
| 1,637,656 | Radcliffe | Aug. 2, 1927 |
| 2,202,796 | Hermani | May 28, 1940 |
| 2,446,361 | Clibbon | Aug. 3, 1948 |
| 2,487,620 | Waller | Nov. 8, 1949 |